United States Patent [19]

Leslie et al.

[11] 4,449,248
[45] May 15, 1984

[54] BATTERY SAVING RADIO CIRCUIT AND SYSTEM

[75] Inventors: Samuel A. Leslie; Robert C. Schwartz, both of Forest, Va.

[73] Assignee: General Electric Company, Lynchburg, Va.

[21] Appl. No.: 344,730

[22] Filed: Feb. 1, 1982

[51] Int. Cl.³ ........................... H04B 7/00; H04B 1/16
[52] U.S. Cl. .................... 455/38; 340/825.52; 455/53; 455/228; 455/231; 455/343
[58] Field of Search ............... 340/825.44, 825.47, 340/825.52; 455/343, 38, 227, 228, 231, 4, 31, 35, 53, 54, 88, 140, 68, 70

[56] References Cited

U.S. PATENT DOCUMENTS

| | | |
|---|---|---|
| Re. 28,222 | 11/1974 | Wycoff . |
| 2,912,571 | 11/1959 | Jacobsen et al. . |
| 3,513,399 | 5/1970 | Wycoff . |
| 3,599,100 | 8/1971 | Ward . |
| 3,611,156 | 10/1971 | Ward . |
| 3,651,413 | 3/1972 | Wycoff . |
| 3,769,593 | 10/1973 | Williams . |
| 3,774,114 | 11/1973 | Dahlgren . |
| 3,783,384 | 1/1974 | Wycoff . |
| 4,068,177 | 1/1978 | Gillis . |
| 4,181,893 | 1/1980 | Ehmke . |
| 4,194,153 | 3/1980 | Masaki et al. ............ 455/31 |
| 4,334,319 | 6/1982 | Gurry ..................... 455/343 |

FOREIGN PATENT DOCUMENTS

| | | |
|---|---|---|
| 10923 | 5/1980 | European Pat. Off. . |
| 52-51801 | 4/1977 | Japan ..................... 455/343 |
| 52-71902 | 6/1977 | Japan ..................... 455/343 |
| 53-63905 | 6/1978 | Japan ................. 340/825.44 |
| 55-26754 | 2/1980 | Japan ..................... 455/343 |
| 1038517 | 8/1966 | United Kingdom . |
| 1111006 | 4/1968 | United Kingdom . |
| 1325880 | 8/1973 | United Kingdom . |

OTHER PUBLICATIONS

"Battery-Saving Techniques For Radio Paging Systems" by Keith H. Wycoff, Proceedings of 1975 IEEE International Conference on Communications, pp. 37-17 through 37-20.

Primary Examiner—Marc E. Bookbinder
Attorney, Agent, or Firm—Cushman, Darby & Cushman

[57] ABSTRACT

An improved battery saving circuit for radio receivers and/or radio transceivers and/or radio communication systems of same under the control of one or more control radio transmitters and/or transceivers. The "on" and "off" time intervals for the battery saving circuits in all remote radio receivers and/or transceivers is actively and dynamically controlled in real time from a central control station so as to provide improved battery saving features.

22 Claims, 6 Drawing Figures

BATTERY SAVING RADIO CIRCUIT AND SYSTEM

This invention is generally directed to battery saving circuits for radio receivers and/or transceivers and to systems of such radio circuits in intermittent communication with a central control station. In particular, it is directed to method and apparatus for controlling the ratio of "on" to "off" time intervals during which power consuming circuits are energized and not energized respectively in a radio receiver or transceiver circuit so as to better conserve battery power The general problem of extending battery life for a radio receiver and/or transceiver circuitry is an old and well known one to which many past solutions have been attempted. Indeed, these prior solutions have already resulted in considerable improvement of the available effective battery life for such radio circuits.

The general problem can be appreciated if one considers the operation of battery powered portable or mobile radios, personal paging radios, battery operated rural telephone services, etc. In these and perhaps other contexts, one valuable function of a radio receiver circuit is to continuously monitor a given communication channel for intended calling signals—that is, to remain on line in readiness for receipt of an unscheduled intelligence bearing message. However, if the power consuming radio receiver or transceiver circuits are actually continuously energized, substantial amounts of electrical energy are consumed even in the "stand by" mode of operation when continuous channel monitoring functions are performed. Even with modern day transistorized and integrated circuit radio receivers and transceivers, the amount of power thus consumed can seriously limit effective battery life. Alternatively stated, the batteries required for a given application must have sufficient electrical capacity (and hence size, and weight) to provide the power consumed by these circuits during the stand by mode. Any effective reduction in the power consumed during the stand by mode will be seen to have practical advantages in either lengthening the interval between required battery changes and/or minimizing the weight, size, etc. requirements for the battery power source.

As previously stated, this general problem has long been recognized. Prior attempts to solve the problem have typically involved pulsing circuits of various kinds for only intermittently activating the major power consuming circuits of a radio receiver and/or transceiver. In effect, the radio receiver is permitted to remain inactive or "asleep" for most of the time and is only intermittently energized or "awakened" at periodic short intervals to monitor a given communication channel or channels. If, during such an intermittent brief sampling period, an attempt to communicate is discovered, the receiver and/or transceiver circuits are maintained in an energized or "awakened" condition for a further extended time during which an actual communication of information is effected. As soon as that communication process is completed or after some predetermined interval, these prior art battery saving circuits typically again lapse into a battery saving mode of operation where the power consuming circuits are energized only during predetermined regular brief intervals. Some prior art circuits have also used an inverse control procedure where the receiver is turned "off" for predetermined intervals only if it is successfully receiving a specified digital synchronization pattern of binary bits.

Some prior art systems have utilized different modulation tones to encode address and/or message information on an r.f. carrier while others have used digital approaches (which may, in turn, utilize a frequency shifted carrier or the like for transmitting digital synchronization, address and message data).

In a system of many such battery saving circuits (e.g. a metropolitan area having many personal paging radios in a given system), a relatively simple battery saving circuit may become ineffective. For example, in a large system there may be attempts to communicate with some one or more of the extant radio circuits at virtually all times. If all radio circuits are removed from battery saving operation any time such a communication attempt is being made, it should be appreciated that there might soon, in practical effect, be no real battery saving time at all. Accordingly, there have been prior art attempts to divide such a system of radio circuits into predetermined groups which have special group addressing codes (e.g. tones, digital words, etc.) and to enhance the battery saving features by requiring identification of one of these predetermined group address signals before a given radio receiver or transceiver is removed from its stand by battery saving mode of operation. Accordingly, when communication attempts are being made to a given radio circuit, only the radio circuits in that given group will be taken out of the battery saving mode of operation.

Some prior art systems are asynchronous in operation. For example, all radio circuits may have a regular sampling interval of 0.5 second and a group preamble tone (which precedes any attempt to communicate with one or more receivers of a given group) which is substantially longer than 0.5 second in duration. Accordingly, no matter when an attempt is made to communicate with a given group of stations, after the initial preamble tone has ended, all radio circuits of that given group will have been removed from their battery saving mode of operation and energized so as to accept any communication addressed thereto or perhaps addressed generally to every radio circuit of a given group. Other prior art systems have attempted a synchronous mode of operation on a regular time sharing basis. For example, each group of radio circuits may be assigned a fixed predetermined time slot in a regularly recurring sequence of such time slots. If so, the battery saving circuits of each individual radio circuit may be designed so as to synchronously monitor centrally transmitted synchronization signals and their respective predetermined assigned time slots but to otherwise be in a substantially unenergized battery saving mode of operation.

Typical prior art approaches to the battery saving such as those discussed above may be found in the following prior art references:

U.S. Pat. No. 2,912,571—Jacobsen et al (1959)
U.S. Pat. No. 3,513,399—Wycoff (1970)
U.S. Pat. No. 3,599,100—Ward (1971)
U.S. Pat. No. 3,611,156—Ward (1971)
U.S. Pat. No. 3,651,413—Wycoff (1972)
U.S. Pat. No. Re. 28,222—Wycoff (1974)
U.S. Pat. No. 3,769,593—Williams (1973)
U.S. Pat. No. 3,774,114—Dahlgren (1973)
U.S. Pat. No. 3,783,384—Wycoff (1974)
U.S. Pat. No. 4,068,177—Gillis (1978)
U.S. Pat. No. 4,181,893—Ehmke (1971)
U.S. Pat. No. 4,194,153—Masaki et al (1980)

U.K. Patent No. 1,038,517
U.K. Patent No. 1,111,006
U.K. Patent No. 1,315,880
"Battery-Saving Techniques For Radio Paging Systems" by Keith H. Wycoff, Proceedings of 1975 IEEE International Conference on Communications, pp. 37-17 thru 37-20

SUMMARY OF THE INVENTION

In the contrast to the above-described prior art battery saving techniques which have depended upon a predetermined, fixed or "passive" on/off timing for the battery saving circuits, it has now been discovered that significant further improvement in the battery saving features of radio receivers, radio transceivers and/or systems involving plural radio receivers and transceivers in connection with a central control radio station may be had by positively commanding or controlling the on/off time in each radio transmitter from the central station.

In the exemplary embodiment, a radio receiver circuit is intermittently powered through a controllable power supply switch so as to reduce the use of electrical power consumption similar to the prior art practices discussed above. However, in addition, the present invention provides a programmable timing mechanism connected to control the operation of the power supply switch so as to remove operating power from the receiver for a time duration which is commanded (i.e. determined) by electrical control signals received through the local radio receiver from a central control station. That is, a programmable timer is connected to control the power supply switch in response to coded electrical signals (e.g. tones, digital signals, etc.) received via the radio receiver. In this manner, the elapsed time interval which occurs before the radio receiver is next supplied with power (so as to enable receipt of further radio signals) is actively determined (and may be changed) in accordance with these coded electrical signals.

The radio system which includes plural groups a corresponding predetermined group of radio circuits in the system via their battery saving supply switches. Thus, in the context of the entire system, a very flexible battery saving function is provided. The effective on/off ratio for any given group of radio receivers or transceivers can be dynamically changed as desired (e.g. as a function of real time itself, as a function of the actual then existing service demand, as a function of an assigned priority status, etc.) so as to further increase the net battery saving potential of the radio receiver and transceiver circuits within the system. Desired address and message data is also transmitted by the control station in a dynamic and actively synchronized way so that it is transmitted at real times synchronized with the time intervals during which power is actually being supplied by the battery saving circuits of a corresponding group of radio circuits via their battery saving power supply switches.

As will be appreciated, the use of this invention may, at times, prolong the minimum intervals between possible access to a given radio receiver or transceiver by the central station. In the preferred exemplary embodiment, a manually operable overrride control is provided so as to permit the operator of any given radio receiver or transceiver to manually take the circuit out of battery saving and monitor for possible emergency messages from the control station or to originate message transmissions to the control station should he have any desire to do so.

In one embodiment of the invention, all groups of radio receivers or transceivers may be caused to synchronously come out of battery saving to simultaneously receive instructions as to the duration of the next "off" period for all but selected a group(s) which may be permitted to remain on for some further time during which message data may be received from the central station. In another embodiment, different groups may be caused to come out of battery saving modes at different time intervals to receive their own unique instructions for the duration of the next "off" time interval. Other embodiments may also be devised. However, in all such embodiments, the effective on/off ratio of battery saving circuit operation is actively and dynamically controlled in accordance with coded electrical signals received from a central control station In short, the "off" times for the various radio receivers and/or transceivers of a given system is flexibly controlled so as to maximize battery saving by central control station which also maintains an up-to-date account of the arrival of expected "on" times (e.g. the expiration of the current "off" time interval) for all such radio receivers or transceivers so that its transmissions of further instructions and/or message data may be synchronously generated and transmitted.

BRIEF DESCRIPTION OF THE FIGURES

These as well as other objects and advantages of this invention will be more clearly understood by carefully reading the following detailed description of the presently preferred embodiment of this invention taken together with the accompanying drawings, of which.

Figure 1:
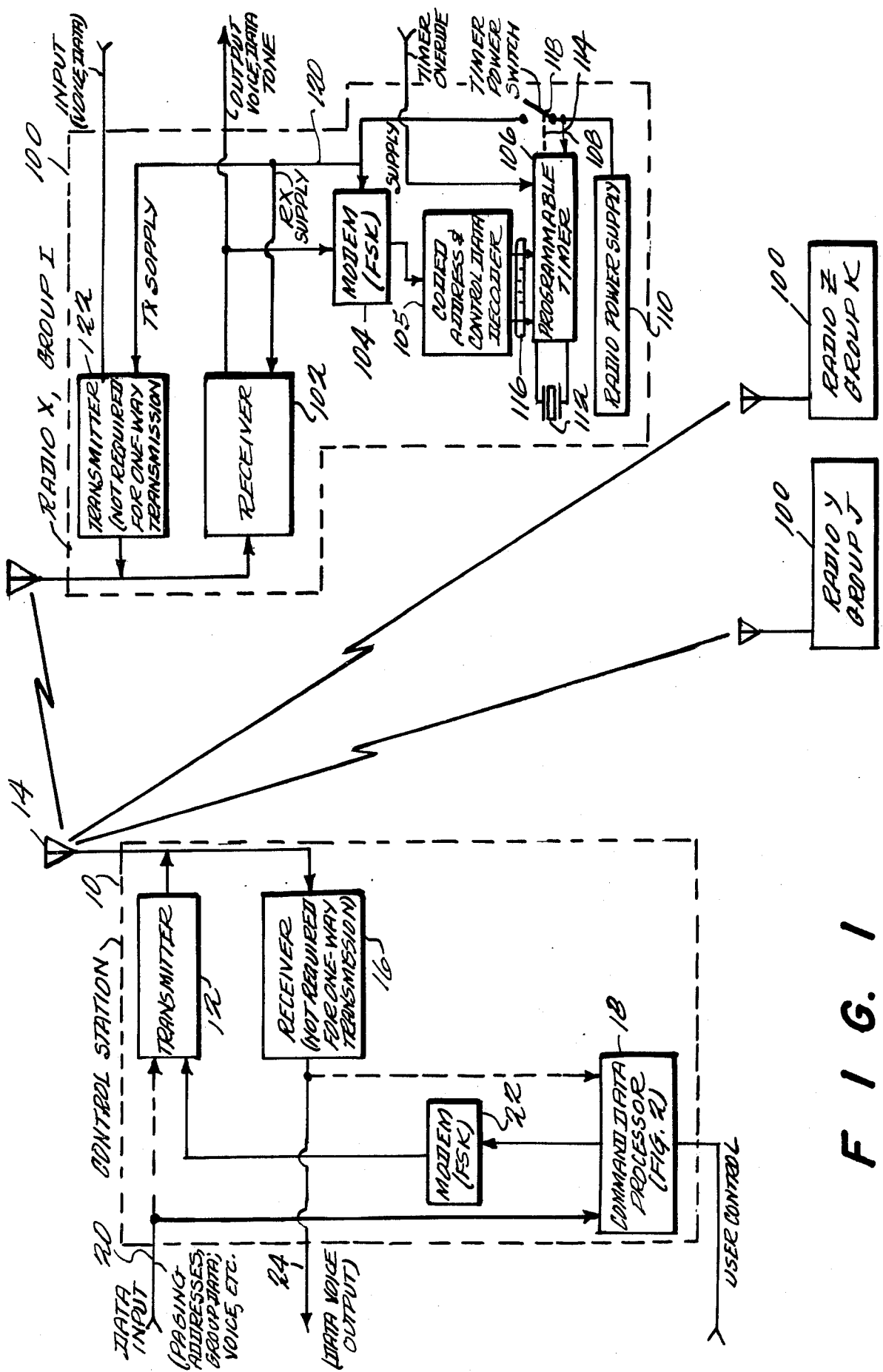
FIG. 1 is a schematic diagram of a battery saving radio system in accordance with this invention employing plural radio receivers/transceivers in communication with a central control station radio transmitter/transceiver.

The battery saving radio system shown in FIG. 1 includes a control station 10 and plural radio receiver/transceiver circuits 100 identified in FIG. 1 as radio X, group I (comprising a group of radio circuits like that shown), radio Y, group J (also comprising a group of similar radio circuits coded to respond to a different group address); and radio Z, group K (also comprising a plurality of similar radio circuits coded to respond to a unique group address). The control station 10 includes a conventional radio transmitter 12 which is in radio communication with all radios X, Y, Z via antenna 14. If desired, a conventional radio receiver 16 may be provided for two-way communication capability.

The control station 10 includes a command data processor 18 which drives a conventional FSK modem (for example, a type MC 14412 universal low-speed modem which is compatible with the Western Electric type 103) for modulating coded address, command and information bearing data (and perhaps embedded self-clocking signals) onto the carrier wave transmitted by the transmitter 12. General data input such as paging addresses, message data, voice, etc. may be conventionally input at 20 via the command data processor 18 and FSK modem 22 or directly as shown by dotted lines in FIG. 1. Received signals may be output at 24 for processing by other circuits or may be provided indirectly via the command data processor as also indicated by dotted lines in FIG. 1.

The structure and operation of the control station 10 in FIG. 1 is conventional except insofar as the generation of battery saving command signals for transmission to the various groups of radio circuits X, Y and Z is concerned. In the presently preferred exemplary embodiment, such structure and operation is achieved by a microprocessor-based command data processor 18 shown in more detail at FIG. 2 when operated under control of an appropriate stored program, of which an exemplary form is shown by the flow charts of FIGS. 5 and 6.

Figure 2:
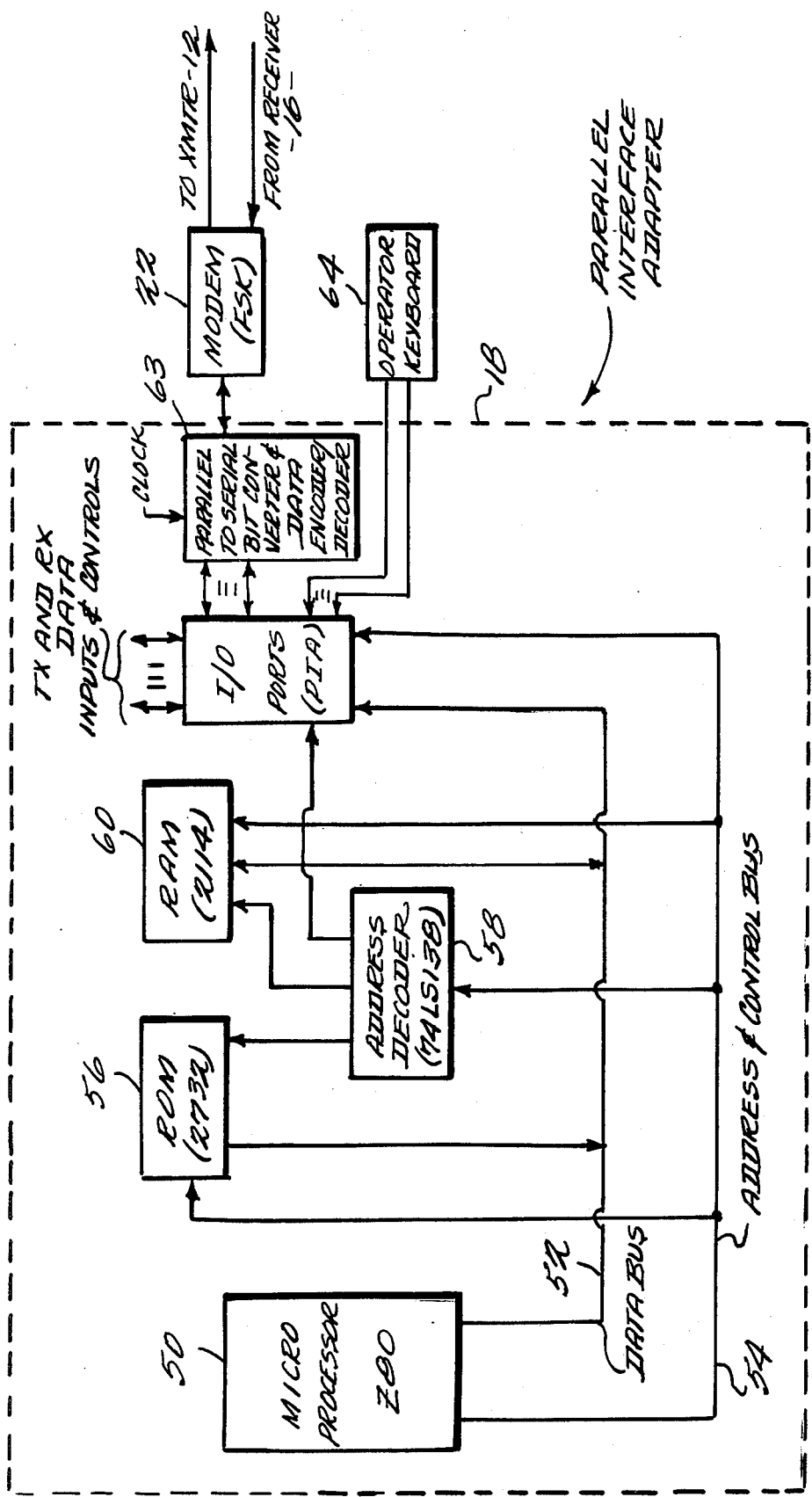
FIG. 2 is a more detailed schematic diagram of the command data processor utilized in the control station of FIG. 1.

The microprocessor-based command data processor 18 shown in FIG. 2 comprises a conventional microprocessor bus-based data processing system. For example, a Z80 type of microprocessor 50 is connected to the usual data bus 52 and to the usual address and control bus 54 for communication with other compatible integrated circuit digital computing circuits. For example, as shown in FIG. 2, a read only memory (typically of type 2732) 56 is provided for storage of the operating program under which microprocessor 50 is controlled. The contents of ROM 56 are accessed by the microprocessor 50 via a conventional address decoder 58 (typically of type 74LS138) using buses 52 and 54. Temporary storage of changing data is achieved by the random access memory 60 (typically of type 2114) which is similarly accessed by the microprocessor 50. Finally, conventional IO ports (typically commercially available parallel interface adapters compatible with the microprocessor 50) provide the microprocessor 50 with the ability, under appropriate program control, to communicate with external devices.

As shown in FIG. 2, some of the IO ports 62 may be dedicated to providing and receiving control and other inputs directly to/from the transmitter and receiver circuits. Others are connected to drive a conventional parallel-to-serial bit converter and encoder 63 (which typically encodes/decodes the data in a self-clocking form for serial data transmission as will be appreciated). The converter encoder/decoder 63 in turn drives the FSK modem 22 so as to provide suitable signals for modulating the carrier of the transmitter 12. User control inputs may be made via a conventional operator keyboard 64 which is also connected to the IO ports 62.

Since the electrical interconnection of this typical microprocessor based data processor system is conventional, it is not believed necessary to describe it in further detail. However, the novel portions of the controlling programs stored in ROM 56 are exemplified by the program flow control charts shown in FIGS. 5 and 6 as will be explained in greater detail below.

Returning to FIG. 1, each of the radio circuits 100 is seen to include a conventional receiver 102 whose output is, at least in part, fed through a conventional FSK modem 104 (e.g. typically a low-speed modem compatible with the Western Electric type 103) to provide self-clocked serial digital input to a conventional coded address and control data decoder 105. The decoder 105 may, for example be of the type that detects a predetermined repeated binary word (i.e. address) without the necessity for bit synchronization as described in co-pending, commonly assigned U.S. patent application Ser. No. 177,488—Garner now U.S. Pat. No. 4,361,896 and include conventional shift register circuits for capturing "time-off" control information following successfully detected address data. For example, a conventional (synchronous or asynchronous) serial address word decoder may be used to provide a control output whenever a predetermined command address word is received. This control signal may be used to enable an AND gate to thereafter pass the next succession of received binary-valued signals into a shift register under control of a conventionally derived (e.g. from the incoming bit stream itself, if self-clocking) clock signal. When the shift register is thus filled with a transmitted digital command word, some or all of its parallel digital output signals may be used to reprogram the programmable timer as should now be appreciated.

Thus received digital control data controls a conventional programmable timer 106. The programmable timer 106 may comprise one or more conventional counters or other timing circuits formed by integrated circuit techniques (preferably of the CMOS type e.g. typically of type MC14536B or MC14541B) and is connected continuously at 108 to the radio power supply 110 (typically a battery). The programmable timer circuit 106 may, for example, include a free running clock controlled by crystal 112 and suitable counters which count down from a beginning contents determined by the decoded control output of the FSK modem 104 or which count up to a count determined by the decoded control output of the FSK modem 104.

In any event, the programmable timer 106 will provide a control output (either mechanical or electrical) at 114 after a time interval which is determined by the input on lines 116. The control output 114 will then control the battery saving power supply switch 118 (either mechanical or electrical but preferably electrical) so as to supply power via line 120 to the FSK modem 104, the receiver 102 and, if desired for tranceive service, a transmitter 122. After thus being energized or turned "on", additional properly addressed control signals may be received via receiver 102 and FSK modem 104 to reprogram the programmable timer 106. Typically, the receiver will be left in an "on" condition long enough to determine if there are any messages intended for that particular radio or group of radios before the programmable timer 106 is permitted to again cause reversion to the battery saving mode of operation (i.e. to deenergize or turn "off" the major power consuming circuits of the radio) for another time interval which has been determined by the control data received from the command data processor 18 of the control station 10.

Figure 3:
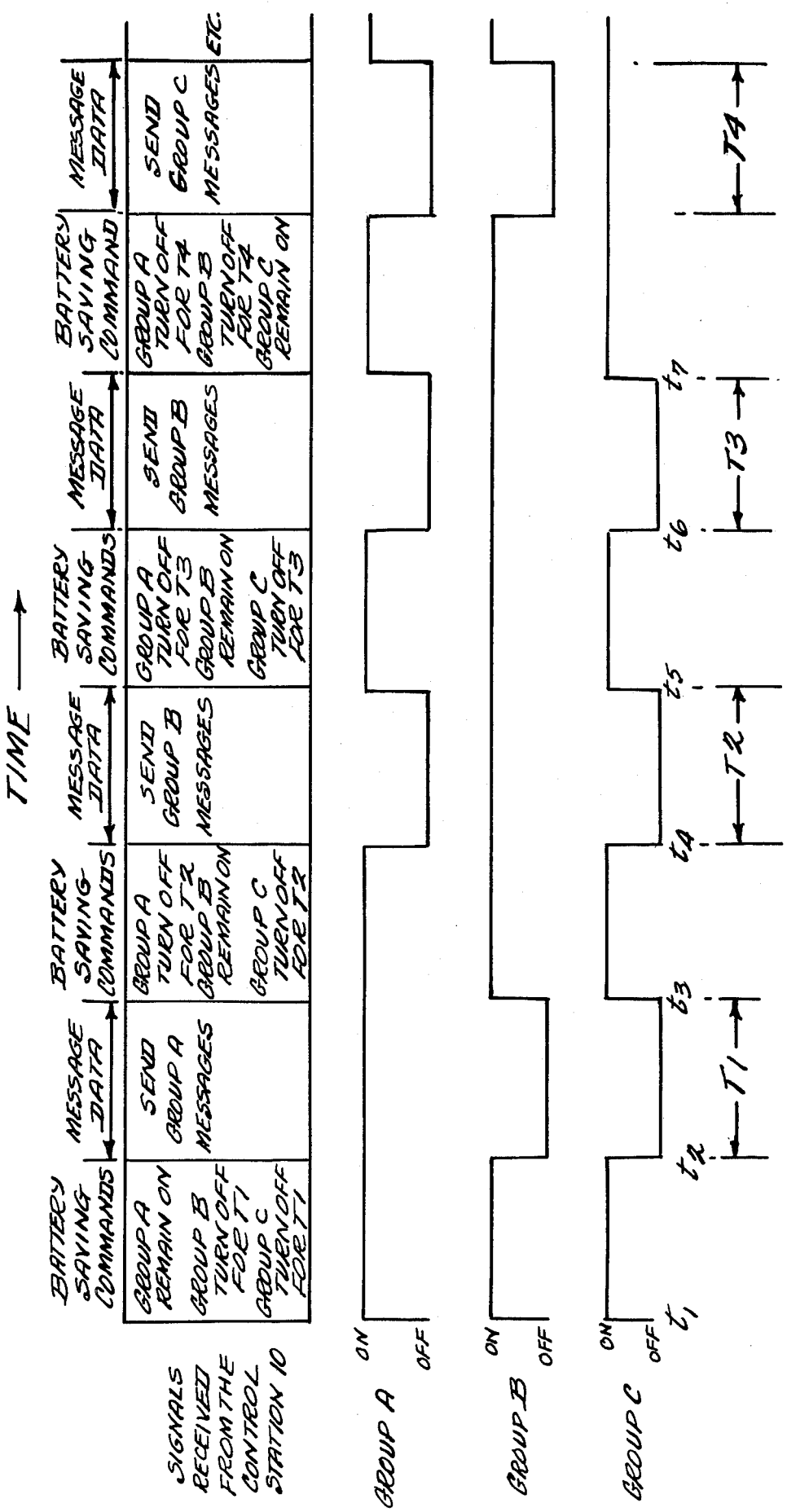
FIG. 3 is an exemplary timing diagram for one operational mode of the FIG. 1 system.

In the timing diagram of FIG. 3, it has been assumed that there are three groups of radio circuits A, B and C. In the illustrated operational mode, each group of receivers has been programmed so as to synchronously come out of battery saving at the same time to listen for additional instructions and/or messages. For example, at $t_1$, all radios in the system come out of battery saving and receive command signals (on the same channel or on different channels) as indicated in FIG. 3. For example, group A may be left in an "on" condition by merely failing to issue any instruction that would cause it to turn "off" or otherwise revert to a battery saving mode of operation. However, groups B and C are each instructed to revert to battery saving for a time interval $T_1$ as determined and commanded by the command data processor 18. At $t_2$, the battery saving commands have all been transmitted and all available messages for group A radio circuits are then transmitted (on the same or different channel as the command signals as may be desired).

At $t_3$, the battery saving period $T_1$ has expired so that radio circuits in groups B and C again come "on line" to listen for further instructions. Here, the command signals issued by the command data processor 18 instruct groups A and C to turn "off" for an interval $T_2$ while group B is permitted to remain "on" so as to receive messages. These messages for group B radio circuits are initiated immediately at $t_4$. However, in the example shown in FIG. 3, not all of the messages to be sent to group B radios have been completed at the end of the interval $T_2$. Accordingly, in this example, during the next command instruction interval which begins at $t_5$, the same set of command instructions are repeated so as to permit a continuation of message transmission to the receivers of group B at time $t_6$. Of course, groups A and C may be instructed to remain "off" for a different (or the same) time $T_3$ as determined by the command data processor 18. During the next instructional interval which begins at $t_7$, groups A and B are instructed to turn "off" for a desired interval $T_4$ while group C radios are left "on" to receive messages.

It should be appreciated that if for some reason no proper group address signals or timing command signals are transmitted or successfully received, all radio circuits will eventually be turned "on" as their previously programmed off-times expire. In this sense, the system is "fail safe".

Figure 4:
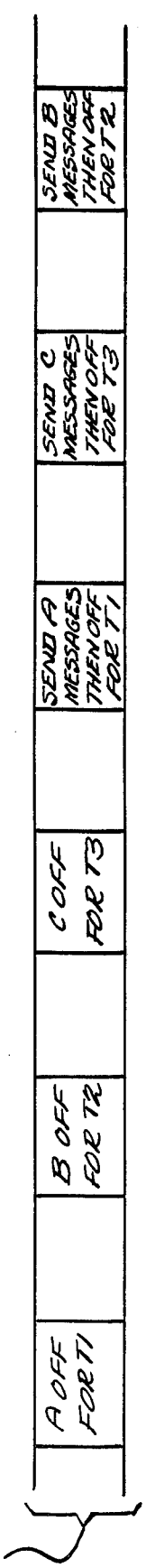
FIG. 4 is another timing diagram for another exemplary operational mode of the system shown in FIG. 1.
Figure 4:
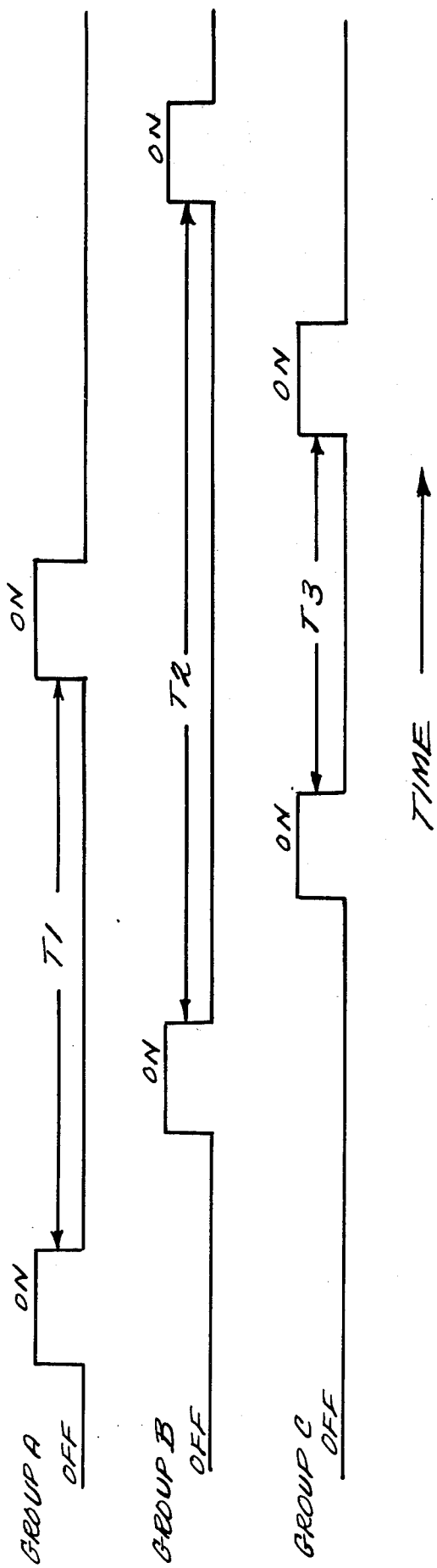

Another possible operational embodiment is depicted in the timing diagram of FIG. 4. Here, a more flexible approach is taken. For example, battery saving commands may be transmitted to only a single group (or to selected subsets of the groups) at any given time while the remaining groups (or subsets) of radio circuits may remain in the battery saving mode of operation for greater periods of time. For example, as shown in FIG. 4, group A is cycled out of battery saving operation after a programmed "off" time $T_1$ while group B is being cycled at an entirely different "off" time interval $T_2$. Group C is being cycled at yet another "off" time interval $T_3$. The choices of actual times $T_1$, $T_22$, $T_3$, etc. will vary according to the requirements of any particular system and the acceptable "waiting" time for contacting a given radio circuit. However, these intervals may typically be on the order of many seconds (e.g. 30) or even minutes or hours.

In the example shown in FIG. 4, there are "dead" times when no messages or command signals are being sent to any radios. However, when messages are available for transmission to any radios in any of the groups, they may be synchronously transmitted either before, during or immediately after the battery saving command signals during the time interval that the desired group of radio circuits is next energized. As will be appreciated, in this embodiment the command data processor 18 should be programmed so as to maintain an accurate account of the expected "on/off" timing for each group of serviced radio circuits so that necessary address, command and message bearing signals can be synchronously generated and transmitted during the expected "on" time for any particular desired group of radio circuits.

Figure 5:
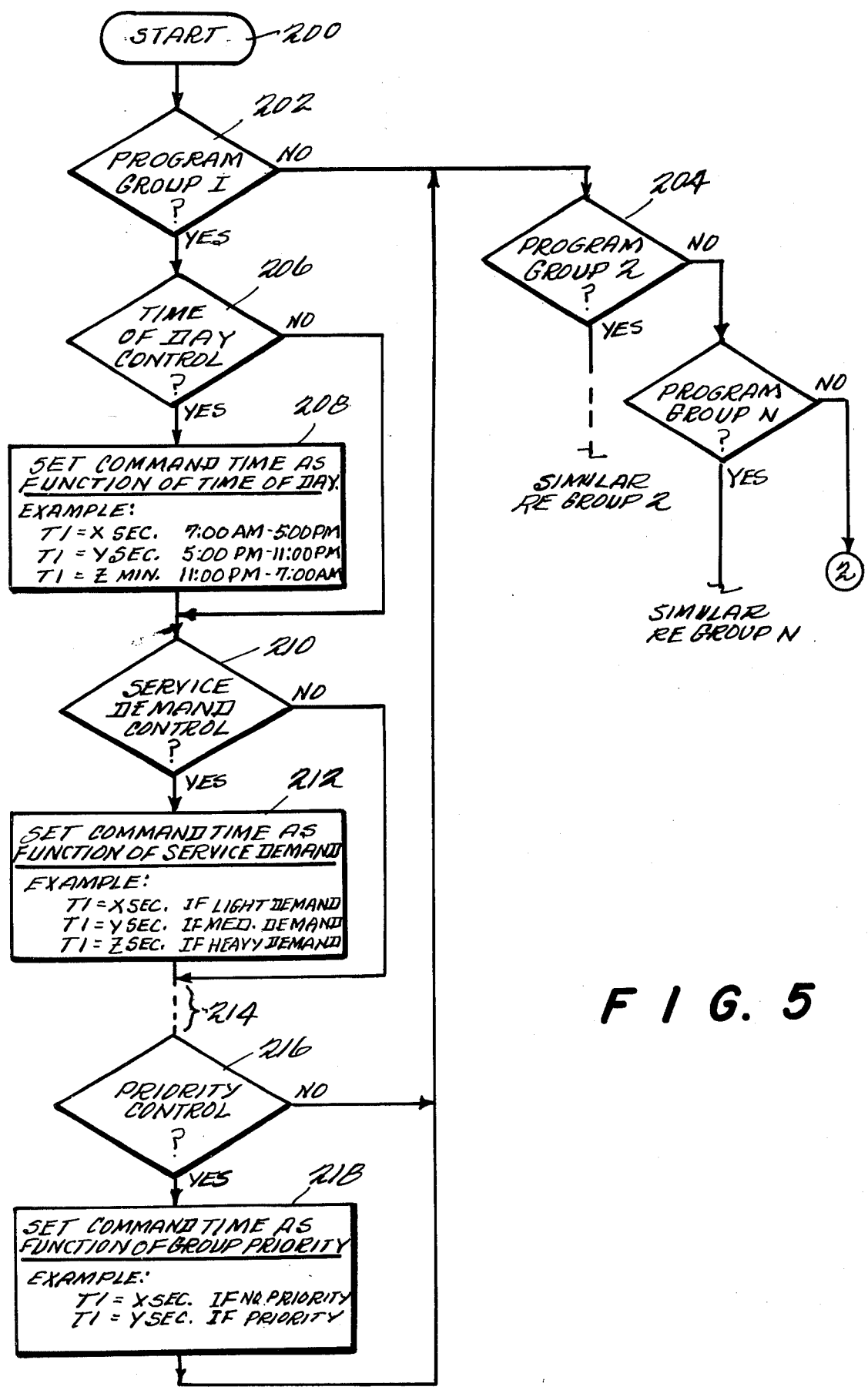
FIGS. 5 and 6 together constitute an exemplary flow chart for a program that may be used in connection with the microprocessor of the command data processor shown in FIGS. 1 and 2.
Figure 6:
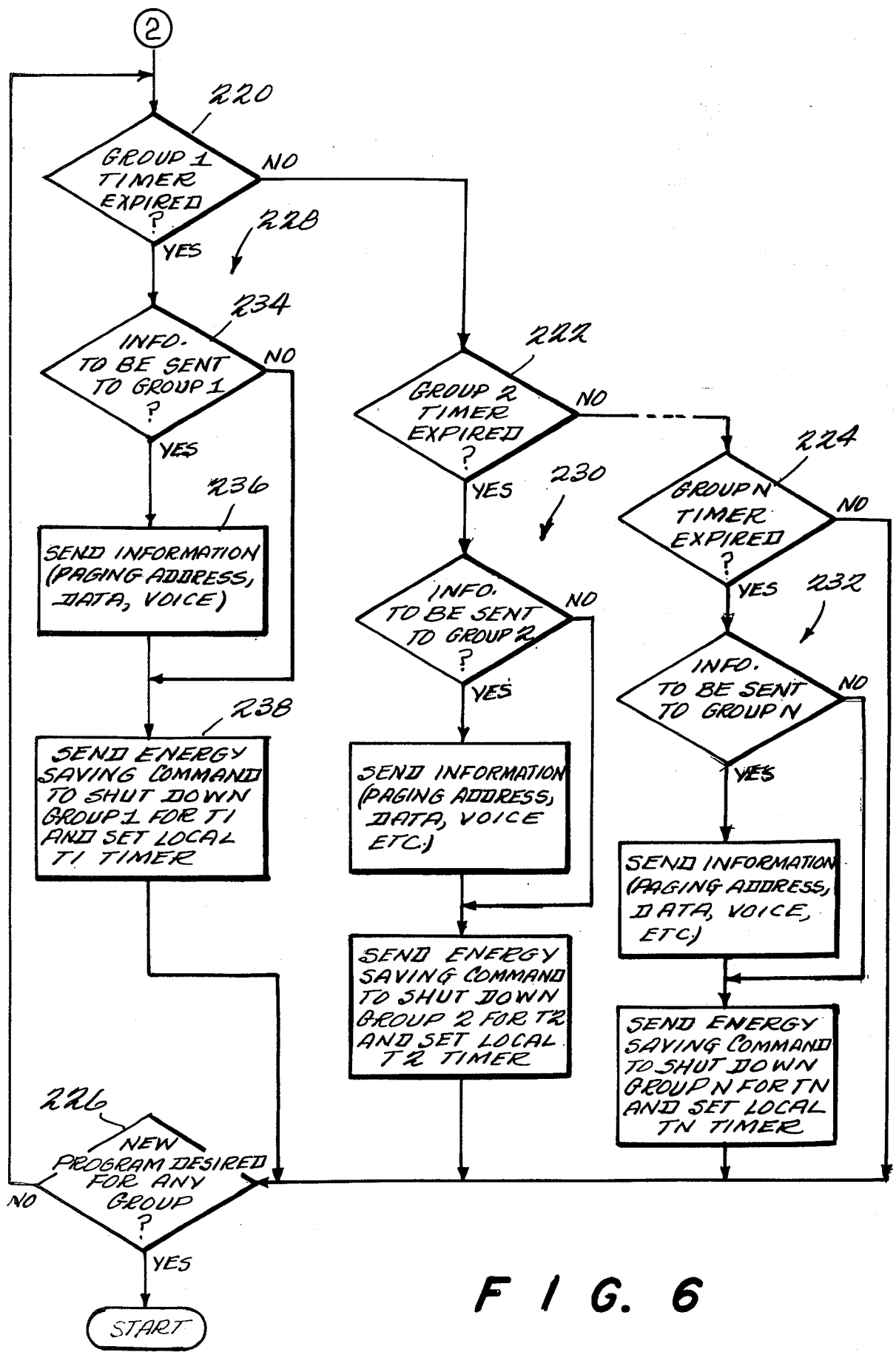

One program for achieving such operational control is depicted in the flow charts of FIGS. 5 and 6. The flow chart of FIG. 5 is particularly suited for changing the programmed off time intervals $T_1$, $T_2$, etc. For example, after entry to this routine at the start block 200, a test is made at 202 to see if any reprogramming of the time interval $T_1$ is required for an associated group 1 of radio circuits. If not, then subsequent tests are made at 204, etc. to see if programming changes for the off time delays associated with any other group is required. If so, then an appropriate subroutine as shown in the remainder of FIG. 5 will be entered. At 206, a test is made to see whether this particular group is programmed as a function of real time (e.g. the time of day). If so, then the command time $T_1$ will be set in accordance with some prearranged schedule as indicated at 208. Subsequently, at 210, a check is made to see if the radios of this particular group are to be programmed in accordance with actual measured service demand. If so, then the command time $T_1$ will be reset (an incremental rather than an absolute resetting may be desired here) in accordance with the actual service demand then being experienced as indicated at 212 in FIG. 5. Other types of adjustments may be made in the command time $T_1$ if desired as indicated at 214 in FIG. 5. Finally, if desired, a priority control may be permitted by checking for this possibility at 216. If priority control is desired for this particular group at this particular time (e.g. as specified by operator inputs) then the command time $T_1$ may be incrementally or absolutely reset at 218 before proceeding on to perform a similar check for desired programming changes at 204, etc. As should be appreciated, the similar subroutines for each different groups will adjust a respectively corresponding command time parameter $T_2$, etc.

Once programming changes of the $T_1$, $T_2$, etc. parameters have been completed, the program will revert to the main operating routine shown in FIGURE 6. Here, a succession of checks is made at 220, 222, 224, etc. to see if a local timer (e.g. a digital word in RAM periodically updated to reflect the passage of time) associated with the "off" time for each of the various groups has yet expired. So long as none of these timers has yet expired, the microprocessor will simply and very quickly loop through these successive tests 220, 222. . .224. As shown in FIG. 6, each time the entire loop is circuited, a test is made at 226 to see if any new programming is desired for any group. (Typically this might test for passage of whole hour intervals, changes in demand since the last programming change, the presence of new operator priority inputs, etc.) If so, program control will be shifted to the start block 200 in FIG. 5. However, unless reprogramming of some of the command time parameters is desired, the microprocessor will maintain a substantially continous (and hence synchronous) check for the expiration of any group "off" time. Once any given groups off time is detected as having expired, then a short control subroutine leg (228, 230, 232, etc.) is entered. Here, for example, in subroutine leg 228, a test is made at 234 to see if any message data has been accumulated for group 1 receivers. If so, then such message data is transmitted as appropriate at 236. As will be appreciated, this transmission of message information is thus caused to be substantially synchronous with the turning "on" of the radio circuits in Group 1. At the conclusion of any desired message transmission at 236, additional battery saving commands are transmitted at 238 which instruct all radio circuits of group 1 to revert to battery saving operation (i.e. to turn "off") for a time duration $T_1$ (which may be zero if all available messages have not yet been transmitted). At the same time, a local software (or hardware) $T_1$ timer is reset so as to enable the group 1 timer test at 220 to go forward through the next cycle of operation. As may be seen, the subroutine program legs 230 and 232 are substantially similar to leg 228 already described except for the fact that they are directed to different groups of radio circuits within the system and, according, to different command time parameters $T_2$, $T_n$, etc.

As should be appreciated, the message sending block 236 may be time limited (either fixedly or programmably) so as to avoid overlapping with the "on" time for radio circuits of other groups. However, if an addressing system is also utilized for accessing particular groups of radios, some overlapping of "on" times for the different groups may be tolerated since the non-selected "on" groups of radios will simply be standing by until their predetermined and fixed addresses are received. Of course, if that mode of operation is permitted, the battery saving potential of the receivers in such a "stand by" mode is lessened.

Typically, a control or base station is used for commanding the radios to specified "off" states for battery power saving. The radios operating under command of the control station may be either one-way (i.e., paging) or two-way (hand-held battery operated radios, automobile radios, etc.).

The command processor provides the timing functions for instructing the radios to power down for specified periods of time for a given set of input conditions. The command processor may include a computer or microprocessor for control flexibility, although for small systems fixed or dedicated logic may be used.

The command processor accepts inputs for determining the time periods that radios should be shut down in its system. In addition to the usual manual inputs from operators to change timing parameters, the command processor accepts time of day inputs, monitors the frequency and nature of transmissions being sent to the radios, service requests from the radios, etc., to automatically change the timing commands being sent to the radios. Examples would be where the shut down time commands would be reduced or temporarily suspended during times of heavy demand, and extended to hours where necessary when no information is to be sent (for example, midnight to early morning).

In addition, the command may be capable of assigning different shut down times for different groups of radios. For example, paging receivers may operate with relatively long shut-down times since data can be batched, while hand-held two-way radios may operate with shorter shut down times (especially during periods of anticipated activity) to accommodate real-time operator requirements. The receiver 16 is not needed if the system is used only with paging receivers. However, it is quite feasible that both one-way paging and two-way radio operation can be accommodated on the same system, with the command processor sending different shut-down information for the two (or more) classes or groups of radios.

The programmable timer records the commanded time interval that the radio is to be shut down, and opens the timer power switch 118 for this interval. Power is thus removed from the system not then being used while power is maintained on the programmable timer to allow it to continue counting. CMOS or other low-current drain devices are used to provide minimum current drain during the "shut-down" period. Upon expiration of the programmed time, the radio is switched back "on" to either receive information or to receive its next shut-down command.

While only a few exemplary embodiments of this invention have been described above in detail, those ordinarily skilled in the art will recognize that there are many possible variations and modifications of this invention which may be made without departing from the many novel and advantageous features of this invention. Accordingly, all such variations and modifications are intended to be included within the scope of the following appended claims.

What is claimed is:

1. An improved battery saving radio system including plural groups of radio circuits each of said groups of radio circuits being associated with a respective, corresponding radio receiver and each said circuit group being of the type which only intermittently powers its associated radio receiver through a controllable power supply switch associated with such receiver so as to reduce the use of electrical power consumption, each of said radio circuit groups comprising:

programmable timing means connected to control said power supply switch and responsive to coded electrical signals received via said radio receiver, when powered, for changing an "off" time interval which occurs between two successive "on" intervals before the radio receiver is next supplied with power in an "on" interval to enable receipt of further radio signals wherein each respectives receiver and its associated radio circuits in a given group include a decoder for responding to a particular coded address to the exclusion of other addresses meant for other receivers in order to allow the respective programmable timing means to change the "off" time intervals in accordance with transmitted time-off signals, and said system further including a radio control station comprising:

control radio transmitting means for transmitting electromagnetic r.f. signals having coded address and time-off signals modulated thereon; and command processing means for generating said coded address and time-off signals during real time intervals synchronized with the "on" time intervals when power is supplied to each radio receiver respectively associated with a predetermined group of radio circuits via its respective power supply switch.

2. An improved battery saving radio system as in claim 1 wherein each of said radio circuit groups further comprises:

radio transmitter means respectively associated with each radio receiver also connected to receive electrical power through its respective said power supply switch.

3. An improved battery saving radio system as in claim 1 wherein said command processing means comprises data processing means for changing said coded time-off signals for a predetermined group of said radio circuits as a funct[on of current real time.

4. Improved battery saving radio system as in claim 1 wherein said command processing means comprises data processing means for changing said coded time-off signals for a predetermined group of radio circuits as a function of current service demand.

5. An improved battery saving radio system as in claim 1 wherein said command processing means comprises data processing means for changing said coded time-off signals for a predetermined group of said radio circuits as a function of a supplied priority status signal.

6. An improved battery saving radio system as in claim 1 wherein said command processing means includes means for transmitting message data to a predetermined receiver and respective group of radio circuits during real time intervals synchronized with the "on" time intervals when power is supplied to each predetermined radio receiver respectively associated with said predetermined radio circuit group via its respective power supply switch.

7. An improved battery saving radio system as in claim 1 or 2 wherein each of said radio circuit groups further comprises:
   a manually operable override control for operating its respective said power supply switch.

8. A battery saving radio system including plural groups of radio circuits each said group of radio circuits being associated with a respective, corresponding radio receiver and each said circuit group being of the type which only intermittently powers its associated radio receiver through a controllable power supply switch associated with such receiver,
   each of said radio receivers producing electrical signals, when energized, from received, electromagnetic signals, each said group of radio circuits comprising:
   a controllable power supply switch connected to supply operating electrical power to energize said radio receiver during successive "on" time intervals; and
   timing means connected to control the operation of said power supply switch to remove said operating power from said receiver for an "off" time interval determined by electrical signals produced by a respective receiver wherein each respective receiver and its associated radio circuits in a given group include a decoder for responding to a particular coded address to the exclusion of other addresses meant for other receivers in order to allow the respective timing means to change the "off" time intervals in accordance with transmitted time-off signals, and
   further including a radio control station comprising:
   control radio transmitting means for transmitting electromagnetic r.f. signals having coded address and time-off signals modulated thereon;
   command processing means for generating said coded address and time-off signals during real time intervals synchronized with the "on" time intervals when power is supplied to each radio receiver respectively associated with a predetermined group of radio circuits via its respective power supply switch.

9. A battery saving radio system as in claim 8 wherein each of said circuit groups further comprises:
   radio transmitter means respectively associated with each radio receiver also connected to receive energizing electrical power through its respective said power supply switch.

10. An improved battery saving radio system as in claim 8 wherein said command processing means comprises data processing means for changing said coded time-off signals for a predetermined group of said radio circuits as a function of current real time.

11. An improved battery saving radio system as in claim 8 wherein said command processing means comprises data processing means for changing said coded time-off signals for a predetermined group of radio circuits as a function of current service demand.

12. An improved battery saving radio system as in claim 8 wherein said command processing means comprises data processing means for changing said coded time-off signals for a predetermined group of said radio circuits as a function of a supplied priority status signal.

13. An improved battery saving radio system as in claim 8 wherein said command processing means includes means for transmitting message data to a predetermined receiver and respective group of radio circuits during real time intervals synchornized with the "on" time intervals when power is supplied to each predetermined radio receiver respectively associated with said predetermined respective radio circuits group via its respective power supply switch.

14. An improved battery saving radio system as in claim 8 or 9 wherein each of said radio circuit groups further comprises:
   a manually operable override control for operating its respective said power supply switch.

15. A battery-saving radio system including plural groups of radio circuits each said group of radio circuits being associated with a respective, corresponding radio receiver and each said circuit group being of the type which only intermittently powers its associated radio receiver through a controllable power supply switch associated with such receiver,
   each said radio receiver receiving electromagnetic r.f. signals and containing demodulator means for producing coded address and time-off signals as an output therefrom, each said receiver connected to receive electrical power through a respective power supply switch,
   each said radio circuit group further comprising:
   decoding means connected to receive said coded signals and to respond to predetermined coded address signals by producing time-off command signals corresponding to said coded time-off signals;
   programmable timer means connected to receive said time-off command signals and to control said power supply switch accordingly so as to remove electrical power therefrom during an "off" time interval corresponding to said time-off command signals after which power is re-supplied to said radio receiver means to enable receipt of additional electromagnetic r.f. signals wherein each respective receiver and its associated radio circuits in a given group responds to a particular coded address to the exclusion of other addresses meant for other receivers in order to allow the respective programmable timer means to change the "off" time intervals in accordance with transmitted time-off signals,
   said system further including a radio control station comprising:
   control radio transmitter means for transmitting electromagnetic r.f. signals having coded address and time-off signals modulated thereof; and command processing means for generating said coded address and time-off signals during real time intervals synchronized with the "on" time intervals when power is supplied to each radio receiver respectively associated with a predetermined group of radio circuits via its respective power supply switch.

16. A battery-saving radio system as in claim 15 wherein said decoding means is also connected to receive electrical power through said respective power supply switch.

17. A battery-saving radio system as in claim 15 further comprising:
radio transmitter means respectively associated with each radio receiver also connected to receive electrical power through said respective power supply switch.

18. A battery saving radio system as in claim 15 wherein said command processing means comprises data processor means for changing said coded time-off signals for a predetermined group of said radio circuits as a function of current real time.

19. A battery saving radio system as in claim 15 wherein said command processing means comprises data processor means for changing said coded time-off signals for a predetermined group of said radio circuits as a function of current service demand.

20. A battery saving radio system as in claim 15 wherein said command processing means comprises data processor means for changing said coded time-off signals for a predetermined group of said radio circuits as a function of a supplied priority status signal.

21. A battery saving radio system as in claim 15 wherein said command processing means includes means for transmitting message data to a predetermined receiver and respective group of radio circuits during real time intervals synchronized with "on" time intervals when power is supplied to each predetermined radio receiver respectively associated with said circuits of said predetermined respective radio circuit group via its respective power supply switch.

22. A battery saving radio system as in claim 15, 16 or 17 wherein each of said circuit groups further comprises:
a manually operable override control for operating its respective said power supply switch.

* * * * *

UNITED STATES PATENT AND TRADEMARK OFFICE
CERTIFICATE OF CORRECTION

PATENT NO. : 4,449,248

DATED : May 15, 1984

INVENTOR(S) : Samuel A. Leslie, Robert C. Schwartz

It is certified that error appears in the above-identified patent and that said Letters Patent is hereby corrected as shown below:

Col. 3, line 10, delete "the" (first occurrence).
Col. 3, line 41, after "groups" insert -- of radio circuits in accordance with this invention, further includes a radio control station which generates coded address and "time-off" signals at real times which are synchronized with the real times that power is being supplied to --
Col. 4, line 18, after "station" insert -- . --
Col. 7, line 49, cancel "T$_2$2" and insert -- T$_2$ --
Col. 10, line 36, cancel "respectives" and insert -- respective --
Col. 10, line 68, cancel "funct[on" and insert -- function --
Col. 11, line 1, cancel "Improved" and insert -- An improved --
Col. 12, line 23, cancel "circuits" and insert -- circuit --
Col. 14, line 12, cancel "predetermlned" and insert -- predetermined --

Signed and Sealed this

Twelfth Day of March 1985

[SEAL]

Attest:

DONALD J. QUIGG

Attesting Officer

Acting Commissioner of Patents and Trademarks